United States Patent
Conway et al.

(10) Patent No.: US 8,023,639 B2
(45) Date of Patent: Sep. 20, 2011

(54) METHOD AND SYSTEM DETERMINING THE COMPLEXITY OF A TELEPHONIC COMMUNICATION RECEIVED BY A CONTACT CENTER

(75) Inventors: Kelly Conway, Lake Bluff, IL (US); David Gustafson, Lake Forest, IL (US); Douglas Brown, Austin, TX (US); Christopher Danson, Austin, TX (US)

(73) Assignee: Mattersight Corporation, Lake Forest, IL (US)

( * ) Notice: Subject to any disclaimer, the term of this patent is extended or adjusted under 35 U.S.C. 154(b) by 845 days.

(21) Appl. No.: 12/079,685

(22) Filed: Mar. 28, 2008

(65) Prior Publication Data

US 2008/0260128 A1 Oct. 23, 2008

Related U.S. Application Data

(60) Provisional application No. 60/921,060, filed on Mar. 30, 2007.

(51) Int. Cl.
*H04M 3/00* (2006.01)
(52) U.S. Cl. .................. 379/266.1; 379/266.02
(58) Field of Classification Search .......... 379/265.01, 379/266.1, 266.07
See application file for complete search history.

(56) References Cited

U.S. PATENT DOCUMENTS

| | | | |
|---|---|---|---|
| 3,851,121 A | 11/1974 | Marvin | |
| 3,855,416 A | 12/1974 | Fuller | |
| 3,855,418 A | 12/1974 | Fuller | |
| 3,971,034 A | 7/1976 | Bell, Jr. et al. | |
| 4,093,821 A | 6/1978 | Williamson | |
| 4,142,067 A | 2/1979 | Williamson | |
| 4,377,158 A | 3/1983 | Friedman et al. | |
| 4,490,840 A | 12/1984 | Jones | |
| 4,694,483 A | 9/1987 | Cheung | |
| 4,811,131 A | 3/1989 | Sander et al. | |
| 4,827,461 A | 5/1989 | Sander | |
| 4,835,630 A | 5/1989 | Freer | |
| 4,851,937 A | 7/1989 | Sander | |
| 4,853,952 A | 8/1989 | Jachmann et al. | |
| 4,864,432 A | 9/1989 | Freer | |
| 4,873,592 A | 10/1989 | Dulaff et al. | |
| 4,888,652 A | 12/1989 | Sander | |
| 4,891,835 A | 1/1990 | Leung et al. | |
| 4,893,197 A | 1/1990 | Howells et al. | |
| 4,958,367 A | 9/1990 | Freer et al. | |
| 5,003,575 A | 3/1991 | Chamberlin et al. | |

(Continued)

FOREIGN PATENT DOCUMENTS

EP   0862304 A2   9/1998
(Continued)

*Primary Examiner* — Creighton Smith
(74) *Attorney, Agent, or Firm* — McDermott Will & Emery LLP

(57) ABSTRACT

A method of determining the complexity of a telephonic communication received by a contact center is provided. The method comprises the step of establishing a call rule based on one or more of a call duration threshold, a non-interaction threshold, a distress event threshold, a third party dialog threshold, and a call transfer threshold. A recorded telephonic communication is received and call attributes associated with the telephonic communication are determined. The call attributes include one or more of the following: call duration data, non-interaction data, distress event data, third party dialog data and call transfer data. The established call rule is compared to the call attributes of the telephonic communication, and data indicative of the complexity of the telephonic communication is generated.

15 Claims, 11 Drawing Sheets

U.S. PATENT DOCUMENTS

| | | |
|---|---|---|
| 5,008,835 A | 4/1991 | Jachmann et al. |
| 5,148,483 A | 9/1992 | Silverman |
| 5,148,493 A | 9/1992 | Bruney |
| 5,206,903 A | 4/1993 | Kohler et al. |
| 5,216,744 A | 6/1993 | Alleyne et al. |
| 5,239,460 A | 8/1993 | LaRoche |
| 5,274,738 A | 12/1993 | Daly et al. |
| 5,299,260 A | 3/1994 | Shaio |
| 5,339,203 A | 8/1994 | Henits et al. |
| 5,396,371 A | 3/1995 | Henits et al. |
| 5,446,603 A | 8/1995 | Henits et al. |
| 5,448,420 A | 9/1995 | Henits et al. |
| 5,457,782 A | 10/1995 | Daly et al. |
| 5,467,391 A | 11/1995 | Donaghue et al. |
| 5,500,795 A | 3/1996 | Powers et al. |
| 5,535,256 A | 7/1996 | Maloney et al. |
| 5,559,875 A | 9/1996 | Bieselin et al. |
| 5,561,707 A | 10/1996 | Katz |
| 5,577,254 A | 11/1996 | Gilbert |
| 5,590,171 A | 12/1996 | Howe et al. |
| 5,590,188 A | 12/1996 | Crockett |
| 5,594,790 A | 1/1997 | Curren et al. |
| 5,594,791 A | 1/1997 | Szlam et al. |
| 5,621,789 A | 4/1997 | McCalmont et al. |
| 5,633,916 A | 5/1997 | Goldhagen et al. |
| 5,646,981 A | 7/1997 | Klein |
| 5,696,811 A | 12/1997 | Maloney et al. |
| 5,710,884 A | 1/1998 | Dedrick |
| 5,712,954 A | 1/1998 | Dezonno |
| 5,717,742 A | 2/1998 | Hyde-Thomson |
| 5,721,827 A | 2/1998 | Logan et al. |
| 5,724,420 A | 3/1998 | Torgrim |
| 5,732,216 A | 3/1998 | Logan et al. |
| 5,734,890 A | 3/1998 | Case et al. |
| 5,737,405 A | 4/1998 | Dezonno |
| 5,757,904 A | 5/1998 | Anderson |
| 5,764,728 A | 6/1998 | Ala et al. |
| 5,768,513 A | 6/1998 | Kuthyar et al. |
| 5,784,452 A | 7/1998 | Carney |
| 5,790,798 A | 8/1998 | Beckett, II et al. |
| 5,799,063 A | 8/1998 | Krane |
| 5,809,250 A | 9/1998 | Kisor |
| 5,815,551 A | 9/1998 | Katz |
| 5,818,907 A | 10/1998 | Maloney et al. |
| 5,818,909 A | 10/1998 | Van Berkum et al. |
| 5,819,005 A | 10/1998 | Daly et al. |
| 5,822,306 A | 10/1998 | Catchpole |
| 5,822,400 A | 10/1998 | Smith |
| 5,822,410 A | 10/1998 | McCausland et al. |
| 5,822,744 A | 10/1998 | Kesel |
| 5,825,869 A | 10/1998 | Brooks et al. |
| 5,828,730 A | 10/1998 | Zebryk et al. |
| 5,841,966 A | 11/1998 | Irribarren |
| 5,845,290 A | 12/1998 | Yoshii |
| 5,848,396 A | 12/1998 | Gerace |
| 5,854,832 A | 12/1998 | Dezonno |
| 5,857,175 A | 1/1999 | Day et al. |
| 5,859,898 A | 1/1999 | Checco |
| 5,864,616 A | 1/1999 | Hartmeier |
| 5,870,549 A | 2/1999 | Bobo, II |
| 5,875,436 A | 2/1999 | Kikinis |
| 5,878,384 A | 3/1999 | Johnson et al. |
| 5,884,032 A | 3/1999 | Bateman et al. |
| 5,884,262 A | 3/1999 | Wise et al. |
| 5,894,512 A | 4/1999 | Zenner |
| 5,897,616 A | 4/1999 | Kanevsky et al. |
| 5,903,641 A | 5/1999 | Tonisson |
| 5,910,107 A | 6/1999 | Iliff |
| 5,911,776 A | 6/1999 | Guck |
| 5,914,951 A | 6/1999 | Bentley et al. |
| 5,915,001 A | 6/1999 | Uppaluru |
| 5,915,011 A | 6/1999 | Miloslavsky |
| 5,923,746 A | 7/1999 | Baker |
| 5,926,538 A | 7/1999 | Deryugin |
| 5,930,764 A | 7/1999 | Melchione et al. |
| 5,937,029 A | 8/1999 | Yosef |
| 5,940,476 A | 8/1999 | Morganstein et al. |
| 5,940,494 A | 8/1999 | Rafacz |
| 5,940,792 A | 8/1999 | Hollier |
| 5,943,416 A | 8/1999 | Gisby |
| 5,945,989 A | 8/1999 | Freishtat |
| 5,946,375 A | 8/1999 | Pattison et al. |
| 5,946,388 A | 8/1999 | Walker et al. |
| 5,951,643 A | 9/1999 | Shelton et al. |
| 5,953,389 A | 9/1999 | Pruett |
| 5,953,406 A | 9/1999 | LaRue et al. |
| 5,964,839 A | 10/1999 | Johnson et al. |
| 5,978,465 A | 11/1999 | Corduroy et al. |
| 5,987,415 A | 11/1999 | Breese et al. |
| 5,991,735 A | 11/1999 | Gerace |
| 6,003,013 A | 12/1999 | Boushy et al. |
| 6,006,188 A | 12/1999 | Bogdashevsky et al. |
| 6,009,163 A | 12/1999 | Nabkel et al. |
| 6,014,647 A | 1/2000 | Nizzari et al. |
| 6,021,428 A | 2/2000 | Miloslavsky |
| 6,026,397 A | 2/2000 | Sheppard |
| 6,029,153 A | 2/2000 | Bauchner et al. |
| 6,058,163 A | 5/2000 | Pattison et al. |
| 6,064,731 A | 5/2000 | Flockhart et al. |
| 6,078,891 A | 6/2000 | Riordan |
| 6,108,711 A | 8/2000 | Beck et al. |
| 6,128,380 A | 10/2000 | Shaffer et al. |
| 6,151,571 A | 11/2000 | Pertrushin |
| 6,173,053 B1 | 1/2001 | Bogart et al. |
| 6,185,534 B1 | 2/2001 | Breese et al. |
| 6,195,426 B1 | 2/2001 | Bolduc et al. |
| 6,205,215 B1 | 3/2001 | Dombakly |
| 6,212,502 B1 | 4/2001 | Ball et al. |
| 6,243,684 B1 | 6/2001 | Stuart et al. |
| 6,246,752 B1 | 6/2001 | Bscheider et al. |
| 6,249,570 B1 | 6/2001 | Glowny et al. |
| 6,252,946 B1 | 6/2001 | Glowny et al. |
| 6,252,947 B1 | 6/2001 | Diamond et al. |
| 6,275,806 B1 | 8/2001 | Pertrushin |
| 6,286,030 B1 | 9/2001 | Wenig et al. |
| 6,289,094 B1 | 9/2001 | Miloslavsky |
| 6,295,353 B1 | 9/2001 | Flockhart et al. |
| 6,330,025 B1 | 12/2001 | Arazi et al. |
| 6,334,110 B1 | 12/2001 | Walter et al. |
| 6,345,094 B1 | 2/2002 | Khan et al. |
| 6,353,810 B1 | 3/2002 | Petrushin |
| 6,363,145 B1 | 3/2002 | Shaffer et al. |
| 6,363,346 B1 | 3/2002 | Walters |
| 6,366,658 B1 | 4/2002 | Bjornberg et al. |
| 6,366,666 B2 | 4/2002 | Bengston et al. |
| 6,370,574 B1 | 4/2002 | House et al. |
| 6,389,132 B1 | 5/2002 | Price |
| 6,392,666 B1 | 5/2002 | Hong et al. |
| 6,404,857 B1 | 6/2002 | Blair et al. |
| 6,404,883 B1 | 6/2002 | Hartmeier |
| 6,411,687 B1 | 6/2002 | Bohacek et al. |
| 6,411,708 B1 | 6/2002 | Khan |
| 6,424,709 B1 | 7/2002 | Doyle et al. |
| 6,434,230 B1 | 8/2002 | Gabriel |
| 6,434,231 B2 | 8/2002 | Neyman et al. |
| 6,446,119 B1 | 9/2002 | Olah et al. |
| 6,466,663 B1 | 10/2002 | Ravenscroft et al. |
| 6,480,601 B1 | 11/2002 | McLaughlin |
| 6,480,826 B2 | 11/2002 | Petrushin |
| 6,490,560 B1 | 12/2002 | Ramaswamy et al. |
| 6,510,220 B1 | 1/2003 | Beckett et al. |
| 6,535,601 B1 | 3/2003 | Flockhart et al. |
| 6,542,156 B1 | 4/2003 | Hong et al. |
| 6,542,602 B1 | 4/2003 | Elazar |
| 6,553,112 B2 | 4/2003 | Ishikawa |
| 6,556,976 B1 | 4/2003 | Callen |
| 6,567,504 B1 | 5/2003 | Kercheval et al. |
| 6,567,787 B1 | 5/2003 | Walker et al. |
| 6,574,605 B1 | 6/2003 | Sanders et al. |
| 6,598,020 B1 | 7/2003 | Kleindienst et al. |
| 6,600,821 B1 | 7/2003 | Chan et al. |
| 6,601,031 B1 | 7/2003 | O'Brien |
| 6,611,498 B1 | 8/2003 | Baker et al. |
| 6,628,777 B1 | 9/2003 | McIllwaine et al. |
| 6,643,622 B2 | 11/2003 | Stuart et al. |
| 6,647,372 B1 | 11/2003 | Brady et al. |
| 6,658,388 B1 | 12/2003 | Kleindienst et al. |

| | | |
|---|---|---|
| 6,658,391 B1 | 12/2003 | Williams et al. |
| 6,662,156 B2 | 12/2003 | Bartosik |
| 6,665,644 B1 | 12/2003 | Kanevsky et al. |
| 6,674,447 B1 | 1/2004 | Chiang et al. |
| 6,691,073 B1 | 2/2004 | Erten et al. |
| 6,700,972 B1 | 3/2004 | McGugh et al. |
| 6,721,417 B2 | 4/2004 | Saito et al. |
| 6,721,704 B1 | 4/2004 | Strubbe et al. |
| 6,724,887 B1 | 4/2004 | Eilbacher et al. |
| 6,728,345 B2 | 4/2004 | Glowny et al. |
| 6,731,307 B1 | 5/2004 | Strubbe et al. |
| 6,731,744 B1 | 5/2004 | Khuc et al. |
| 6,735,298 B2 | 5/2004 | Neyman et al. |
| 6,741,697 B2 | 5/2004 | Benson et al. |
| 6,744,877 B1 | 6/2004 | Edwards |
| 6,751,297 B2 | 6/2004 | Nelkenbaum |
| 6,757,361 B2 | 6/2004 | Blair et al. |
| 6,760,414 B1 | 7/2004 | Schurko et al. |
| 6,760,727 B1 | 7/2004 | Schroeder et al. |
| 6,766,012 B1 | 7/2004 | Crossley |
| 6,775,372 B1 | 8/2004 | Henits |
| 6,782,093 B2 | 8/2004 | Uckun |
| 6,785,369 B2 | 8/2004 | Diamond et al. |
| 6,785,370 B2 | 8/2004 | Glowny et al. |
| 6,788,768 B1 | 9/2004 | Saylor et al. |
| 6,798,876 B1 | 9/2004 | Bala |
| 6,839,671 B2 | 1/2005 | Attwater et al. |
| 6,842,405 B1 | 1/2005 | D'Agosto, III |
| 6,853,966 B2 | 2/2005 | Bushey et al. |
| 6,864,901 B2 | 3/2005 | Chang et al. |
| 6,865,604 B2 | 3/2005 | Nisani et al. |
| 6,868,392 B1 | 3/2005 | Ogasawara |
| 6,870,920 B2 | 3/2005 | Henits |
| 6,871,229 B2 | 3/2005 | Nisani et al. |
| 6,880,004 B2 | 4/2005 | Nisani et al. |
| 6,937,706 B2 | 8/2005 | Bscheider et al. |
| 6,959,078 B1 | 10/2005 | Eilbacher et al. |
| 6,959,079 B2 | 10/2005 | Elazar |
| 6,965,880 B2 * | 11/2005 | Komori ............ 705/75 |
| 7,010,106 B2 | 3/2006 | Gritzer et al. |
| 7,010,109 B2 | 3/2006 | Gritzer et al. |
| 7,027,708 B2 | 4/2006 | Nygren et al. |
| 7,043,745 B2 | 5/2006 | Nygren et al. |
| 7,149,788 B1 | 12/2006 | Gundla et al. |
| 7,203,285 B2 | 4/2007 | Blair |
| 7,216,162 B2 | 5/2007 | Amit et al. |
| 7,219,138 B2 | 5/2007 | Straut et al. |
| 7,305,082 B2 | 12/2007 | Elazar et al. |
| 7,333,445 B2 | 2/2008 | Ilan et al. |
| 7,346,186 B2 | 3/2008 | Sharoni et al. |
| 7,376,735 B2 | 5/2008 | Straut et al. |
| 2001/0043685 A1 | 11/2001 | Bscheider et al. |
| 2002/0002460 A1 | 1/2002 | Perturshin |
| 2002/0002464 A1 | 1/2002 | Perturshin |
| 2002/0010587 A1 | 1/2002 | Perturshin |
| 2002/0110264 A1 | 8/2002 | Sharoni et al. |
| 2002/0111811 A1 | 8/2002 | Bares et al. |
| 2002/0133394 A1 | 9/2002 | Bushey et al. |
| 2002/0143599 A1 | 10/2002 | Nourbakhsh et al. |
| 2002/0194002 A1 | 12/2002 | Petrushin |
| 2003/0033145 A1 | 2/2003 | Petrushin |
| 2003/0033152 A1 | 2/2003 | Cameron |
| 2003/0069780 A1 | 4/2003 | Hailwood et al. |
| 2003/0072463 A1 | 4/2003 | Chen |
| 2003/0142122 A1 | 7/2003 | Straut et al. |
| 2003/0144900 A1 | 7/2003 | Whitmer |
| 2003/0145140 A1 | 7/2003 | Straut et al. |
| 2003/0154092 A1 | 8/2003 | Bouron et al. |
| 2004/0041830 A1 | 3/2004 | Chiang et al. |
| 2004/0054715 A1 | 3/2004 | Cesario |
| 2004/0073569 A1 | 4/2004 | Knott et al. |
| 2004/0100507 A1 | 5/2004 | Hayner et al. |
| 2004/0101127 A1 | 5/2004 | Dezonno et al. |
| 2004/0103409 A1 | 5/2004 | Hayner et al. |
| 2004/0117185 A1 | 6/2004 | Scarano et al. |
| 2004/0158869 A1 | 8/2004 | Safran et al. |
| 2004/0162724 A1 | 8/2004 | Hill et al. |
| 2004/0181376 A1 | 9/2004 | Fables et al. |
| 2004/0190687 A1 | 9/2004 | Baker |
| 2004/0234056 A1 * | 11/2004 | Heilmann et al. ............ 379/196 |
| 2004/0249636 A1 | 12/2004 | Applebaum |
| 2004/0249650 A1 | 12/2004 | Freedman et al. |
| 2004/0264652 A1 | 12/2004 | Erhart et al. |
| 2005/0010411 A1 | 1/2005 | Rigazio et al. |
| 2005/0010415 A1 | 1/2005 | Hagen et al. |
| 2005/0018622 A1 | 1/2005 | Halbraich et al. |
| 2005/0108383 A1 | 5/2005 | DeHaas et al. |
| 2005/0108775 A1 | 5/2005 | Bachar et al. |
| 2005/0123115 A1 | 6/2005 | Gritzer et al. |
| 2005/0204378 A1 | 9/2005 | Gabay |
| 2005/0240656 A1 | 10/2005 | Blair |
| 2006/0028488 A1 | 2/2006 | Gabay et al. |
| 2006/0045185 A1 | 3/2006 | Kiryati et al. |
| 2006/0074898 A1 | 4/2006 | Gavalda et al. |
| 2006/0089837 A1 | 4/2006 | Adar et al. |
| 2006/0111904 A1 | 5/2006 | Wasserblat et al. |
| 2006/0123106 A1 | 6/2006 | Blair et al. |
| 2006/0126817 A1 | 6/2006 | Beckett, II et al. |
| 2006/0133624 A1 | 6/2006 | Waserblat et al. |
| 2006/0150229 A1 | 7/2006 | Blair et al. |
| 2006/0168188 A1 | 7/2006 | Dutton |
| 2006/0200520 A1 | 9/2006 | Vernon et al. |
| 2006/0200832 A1 | 9/2006 | Dutton |
| 2006/0212295 A1 | 9/2006 | Wasserblat et al. |
| 2006/0227719 A1 | 10/2006 | Halbraich |
| 2006/0262920 A1 * | 11/2006 | Conway et al. .......... 379/265.02 |
| 2006/0265089 A1 * | 11/2006 | Conway et al. ................ 700/94 |
| 2006/0268847 A1 | 11/2006 | Halbraich et al. |
| 2006/0285665 A1 | 12/2006 | Wasserblat et al. |
| 2007/0019634 A1 | 1/2007 | Fisher et al. |
| 2007/0083540 A1 | 4/2007 | Gundla et al. |
| 2007/0094408 A1 | 4/2007 | Gundla et al. |
| 2007/0106791 A1 | 5/2007 | Blumenau |
| 2007/0106792 A1 | 5/2007 | Blumenau |
| 2007/0160189 A1 | 7/2007 | Blair |
| 2007/0160190 A1 | 7/2007 | Blair |
| 2007/0160191 A1 | 7/2007 | Blair |
| 2007/0195944 A1 | 8/2007 | Korenblit et al. |
| 2007/0195945 A1 | 8/2007 | Korenblit et al. |
| 2007/0198284 A1 | 8/2007 | Korenblit et al. |
| 2007/0198322 A1 | 8/2007 | Bourne et al. |
| 2007/0198323 A1 | 8/2007 | Bourne et al. |
| 2007/0198325 A1 | 8/2007 | Lyerly et al. |
| 2007/0198329 A1 | 8/2007 | Lyerly et al. |
| 2007/0198330 A1 | 8/2007 | Korenblit et al. |
| 2007/0206764 A1 | 9/2007 | Keren et al. |
| 2007/0206766 A1 | 9/2007 | Keren et al. |
| 2007/0206767 A1 | 9/2007 | Keren et al. |
| 2007/0206768 A1 | 9/2007 | Bourne et al. |
| 2007/0217576 A1 | 9/2007 | Blair |
| 2007/0230345 A1 | 10/2007 | Spohrer et al. |
| 2007/0230444 A1 | 10/2007 | Williams et al. |
| 2007/0230446 A1 | 10/2007 | Williams et al. |
| 2007/0230478 A1 | 10/2007 | Dong et al. |
| 2007/0237525 A1 | 10/2007 | Spohrer et al. |
| 2007/0250318 A1 | 10/2007 | Waserblat et al. |
| 2007/0258434 A1 | 11/2007 | Williams et al. |
| 2007/0263785 A1 | 11/2007 | Williams et al. |
| 2007/0263786 A1 | 11/2007 | Dong et al. |
| 2007/0263787 A1 | 11/2007 | Dong et al. |
| 2007/0263788 A1 | 11/2007 | Spohrer et al. |
| 2007/0274505 A1 | 11/2007 | Gupta et al. |
| 2007/0282807 A1 | 12/2007 | Ringelman et al. |
| 2007/0297578 A1 | 12/2007 | Blair et al. |
| 2008/0002719 A1 | 1/2008 | Byrd et al. |
| 2008/0002823 A1 | 1/2008 | Fama et al. |
| 2008/0004945 A1 | 1/2008 | Watson et al. |
| 2008/0005307 A1 | 1/2008 | Byrd et al. |
| 2008/0005318 A1 | 1/2008 | Dong et al. |
| 2008/0005568 A1 | 1/2008 | Watson et al. |
| 2008/0005569 A1 | 1/2008 | Watson et al. |
| 2008/0005588 A1 | 1/2008 | Watson et al. |
| 2008/0008309 A1 * | 1/2008 | Dezonno et al. ......... 379/265.02 |
| 2008/0040110 A1 | 2/2008 | Pereg et al. |
| 2008/0052535 A1 | 2/2008 | Spohrer et al. |
| 2008/0065902 A1 | 3/2008 | Spohrer et al. |
| 2008/0080385 A1 | 4/2008 | Blair |
| 2008/0080386 A1 | 4/2008 | Calahan et al. |

| | | |
|---|---|---|
| 2008/0080481 A1 | 4/2008 | Calahan et al. |
| 2008/0080482 A1 | 4/2008 | Calahan et al. |
| 2008/0080483 A1 | 4/2008 | Calahan et al. |
| 2008/0080531 A1 | 4/2008 | Williams et al. |
| 2008/0080685 A1 | 4/2008 | Barnes et al. |
| 2008/0080698 A1 | 4/2008 | Williams et al. |
| 2008/0082329 A1 | 4/2008 | Watson |
| 2008/0082330 A1 | 4/2008 | Blair |
| 2008/0082336 A1 | 4/2008 | Duke et al. |
| 2008/0082340 A1 | 4/2008 | Blair et al. |
| 2008/0082341 A1 | 4/2008 | Blair |
| 2008/0082502 A1 | 4/2008 | Gupta |
| 2008/0082669 A1 | 4/2008 | Williams et al. |
| 2008/0195448 A1* | 8/2008 | May .................................. 705/8 |
| 2008/0235731 A1* | 9/2008 | Bryant et al. .................... 725/44 |
| 2009/0216729 A1* | 8/2009 | Kester et al. ...................... 707/3 |
| 2009/0228535 A1* | 9/2009 | Rathi et al. .................... 707/204 |
| 2009/0281977 A1* | 11/2009 | Allen et al. ..................... 706/47 |

FOREIGN PATENT DOCUMENTS

| | | |
|---|---|---|
| EP | 0863678 A2 | 9/1998 |
| EP | 0998108 A1 | 5/2000 |
| EP | 1361739 A1 | 11/2003 |
| EP | 1377907 A2 | 1/2004 |
| EP | 1635534 A2 | 3/2006 |
| GB | 2331201 A | 5/1999 |
| GB | 2389736 A | 12/2003 |
| WO | WO 0174042 A2 | 10/2001 |
| WO | WO 0217165 A2 | 2/2002 |
| WO | WO 02073413 A2 | 9/2002 |
| WO | WO 03001809 A1 | 1/2003 |
| WO | WO 03009175 A1 | 1/2003 |
| WO | WO 2006124942 A1 | 11/2006 |
| WO | WO 2006124945 A1 | 11/2006 |
| WO | WO 2006125047 A1 | 11/2006 |
| WO | WO 2007100345 A1 | 9/2007 |
| WO | WO 2007106113 A2 | 9/2007 |

* cited by examiner

FIG. 11

| Call Type | Daily Hours | | | | Annual Cost |
|---|---|---|---|---|---|
| | Cus. Seg. 1 | Cus. Seg. 2 | Cus. Seg. 3 | Total | |
| Current Balance | 30,300 | 10,220 | 10,005 | 60,625 | $3,637,500 |
| NSF / OD | 5,556 | 28,004 | 15,990 | 49,550 | $2,973,000 |
| Verify Deposit | 10,050 | 10,205 | 15,500 | 35,755 | $2,145,300 |
| Verify Check | 11,205 | 19,395 | 11,055 | 31,655 | $1,899,300 |
| Pending Charge | 8,233 | 5,007 | 3,100 | 16,340 | $980,400 |
| Transfer Funds | 309 | 1,001 | 600 | 1,910 | $114,600 |
| Bank Card | 857 | 150 | 368 | 1,275 | $76,500 |
| On-line Inquiry | 300 | 805 | 95 | 1,200 | $72,000 |
| Fees | 150 | 50 | 950 | 1,150 | $69,000 |
| Account Maintenance | 305 | 400 | 335 | 1,040 | $62,400 |
| Branch Information | 400 | 400 | 220 | 1,020 | $61,200 |
| Other | 95 | 305 | 580 | 980 | $58,800 |
| Simple Call Total | | | | 202,500 | $12,168,000 |

METHOD AND SYSTEM DETERMINING THE COMPLEXITY OF A TELEPHONIC COMMUNICATION RECEIVED BY A CONTACT CENTER

CROSS-REFERENCE TO RELATED APPLICATIONS

The present invention claims priority to U.S. Provisional Patent Application No. 60/921,060, filed Mar. 30, 2007.

TECHNICAL FIELD

The invention relates to a method and system for determining the complexity of a telephonic communication received a contact center, and more particularly, to a method and system for determining the complexity of the telephonic communications of a desired call type.

BACKGROUND OF THE INVENTION

It is known to utilize telephone call centers to facilitate the receipt, response and routing of incoming telephone calls relating to customer service, retention, and sales. It is also known to utilize a web based system to facilitate requests and inquiries related to customer service.

At the contact center, a customer is in contact with a customer service representative ("CSR") or CSR agent who is responsible for answering the customer's inquiries and directing the customer to the appropriate individual, department, information source, or service as required to satisfy the customer's needs. At the contact center, the customer may also enter into an automated self-service system such as, for example, an interactive voice response ("IVR") system. In an IVR system, the customer interacts with the IVR system directly and has the call processed accordingly. During an interaction, a customer may also enter into self-service systems such as an Internet web-based system to transmit inquiries and identify possible solutions.

Automated self-service systems such as IVR and web-based systems provide useful mechanisms to handle non-complex calls. However, instances arise in which a complex customer inquiry is routed to a self-service system, and the self-service system is inappropriately equipped to address the inquiry of a particular call type. Conversely, instances may arise when simple or non-complex calls are routed to a CSR, when the particular call time could be more appropriately and expeditiously handled through a self-service system. Both instances can result in a negative customer interaction which ultimately may be harmful to a customer relationship. Moreover, improper use or non-use of self-service systems can result in inappropriate allocations of contact center resources, including money, time and human resources.

Accordingly, there is a need in customer relationship management ("CRM") for tools useful for determining which calls are best suited for use in such self-service systems. In particular, a need exists for tools that analyze calls between a customer and CSR to determine the complexity of a call or call type, and ultimately determine the appropriateness of routing future calls of a particular call type to self service systems.

The present invention is provided to solve the problems discussed above and other problems, and to provide advantages and aspects not provided by prior systems of this type. A full discussion of the features and advantages of the present invention is deferred to the following detailed description, which proceeds with reference to the accompanying drawings.

SUMMARY OF THE INVENTION

According to the present invention, a method of determining the complexity of a telephonic communication received by a contact center is provided. The method comprises the step of establishing a call rule based on one or more of a call duration threshold, a non-interaction threshold, a distress event threshold, a third party dialog threshold, and a call transfer threshold. A recorded telephonic communication is received and call attributes associated with the telephonic communication are determined. The call attributes include one or more of the following: call duration data, non-interaction data, distress event data, third party dialog data and call transfer data. The established call rule is compared to the call attributes of the telephonic communication, and data indicative of the complexity of the telephonic communication is generated.

According to another aspect of the present invention, a method of determining the complexity of telephonic communication call types received by a contact center is provided. The method comprises the step of establishing a call rule based on at least one the following thresholds: a call duration threshold, a non-interaction threshold, a distress event threshold, a third party dialog threshold, and a call transfer threshold. A plurality of recorded telephonic communications is received and categorized into one of a plurality of call sets. The method further includes the step of determining the call attributes that are associated with each of the telephonic communications. These call attributes can include one or more of the following: call duration data, non-interaction data, distress event data, third party dialog data and call transfer data. The established call rule is then compared to the call attributes of each of the plurality of telephonic communications. Data indicative of the complexity of at least one of the call sets is then generated from the comparison. According to one embodiment, the generated data indicates whether the at least one of the plurality of call sets is self-service eligible.

According to another aspect of the present invention, the method further includes determining the total hours associated with each of the plurality of call sets. Each of the call sets can then be analyzed based on a cost factor.

According to another aspect of the present invention, a computer program for determining the complexity of telephonic communication call types received by a contact center is provided. The computer program is embodied on a computer readable storage medium adapted to control a computer. The computer program comprises a plurality of code segments for performing the task. The computer program receives an input transmission of a predetermined call rule. The computer program also receives a telephonic communication and determines the call attributes associated with the telephonic communication. The call rules are compared by the computer program to the call attributes of the telephonic communication. Output data indicative of the complexity of the telephonic communication is then generated. According to one embodiment, the generated output data indicates whether the at least one of the plurality of call sets is self-service eligible.

According to yet another embodiment of the present invention, a computer program for determining the complexity of a telephonic communication received by a contact center is provided. Again, the computer program is embodied on a computer readable storage medium adapted to control a computer and includes code segments to execute certain tasks. The computer program receives an input transmission of a predetermined call rule that is comprised of at least one of the following thresholds: a call duration threshold, a non-interaction threshold, a distress event threshold, a third party dialog threshold, and a call transfer threshold.

The computer program also receives a plurality of recorded telephonic communications, and categorizes each of the recorded telephonic communications into one of a plurality of call sets (i.e., call types). The computer program determines call attributes associated with the respective recorded telephonic communications that are categorized in at least one of the call sets. The call attributes generally correspond to the thresholds of the call rule, and can include one or more of the following: call duration data, non-interaction data, distress event data, third party dialog data and call transfer data. The computer program then compares the predetermined call rule to the call attributes associated with the recorded telephonic communications categorized in one of the call sets. Output data indicative of the complexity of the call type is then generated and transmitted. According to one embodiment, the generated and transmitted output data indicates whether the call set or call sets are self-service eligible.

According to one aspect of the present invention, the predetermined call rule is automatically and dynamically generated based on the output data.

According to still another aspect of the present invention, the computer program generates an audio file of the telephonic communication. From that audio file a graphical user interface for viewing the telephonic communication on a display is generated. The graphical user interface is configured to display a time-based representation of the telephonic communication. Additionally, the time-based representation includes graphical representations of the call attributes associated with the telephonic communication. According to one embodiment, the time-based representation of the telephonic communication also includes a graphical representation of the progress of the audio file being played.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION

Figure 1:
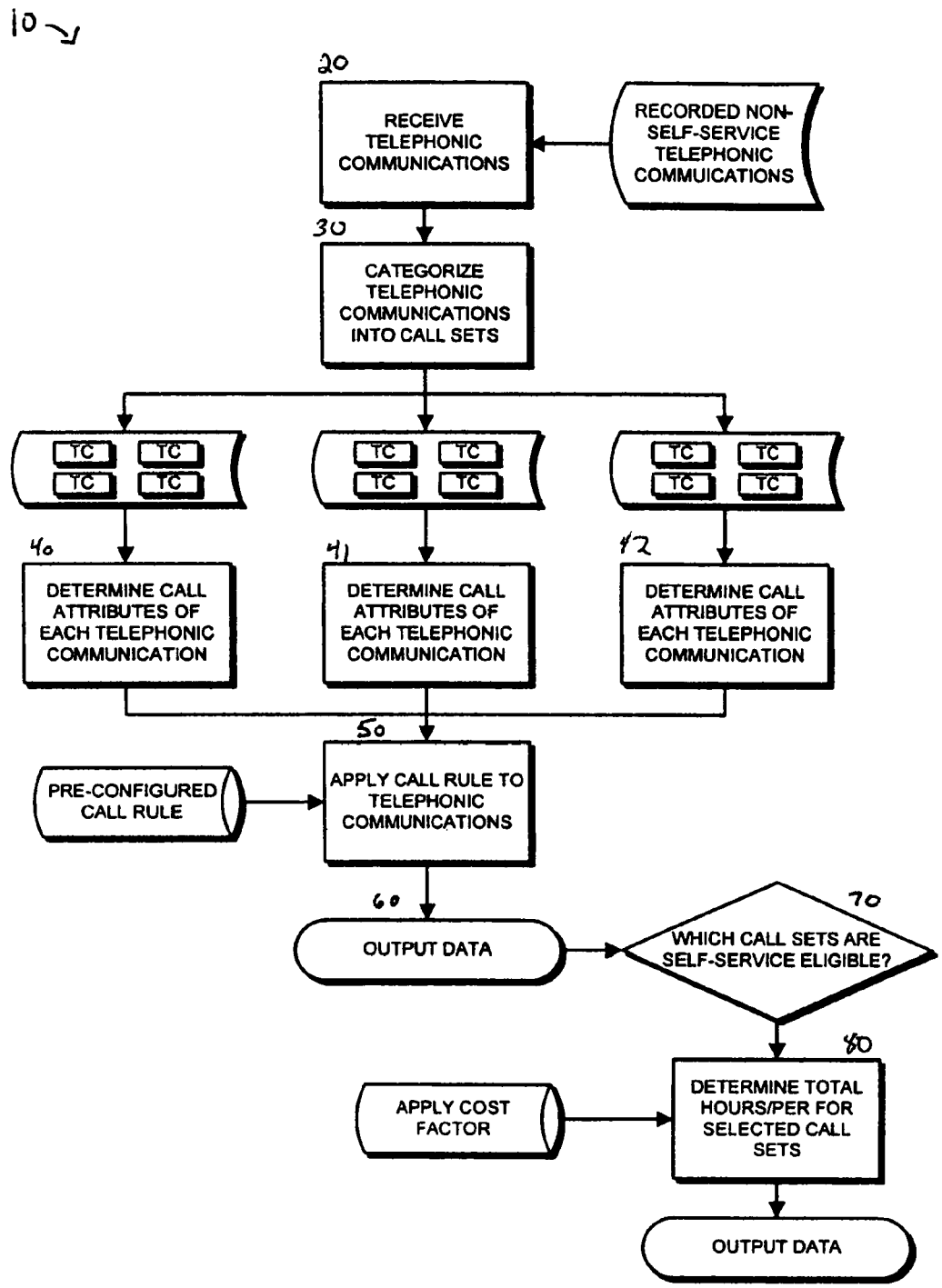
FIG. 1 is a block diagram illustrating a method of determining the complexity of the telephonic communications according to the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIGS. 1-11, a method is provided for determining the complexity of telephonic communication call types that are received by a contact center. A "contact center" as used herein can include any facility or system server suitable for receiving telephonic communications, including via voice-over IP ("VoIP"), transmitted by or through telephone lines, cable, wireless communications or any other suitable means.

Figure 2:
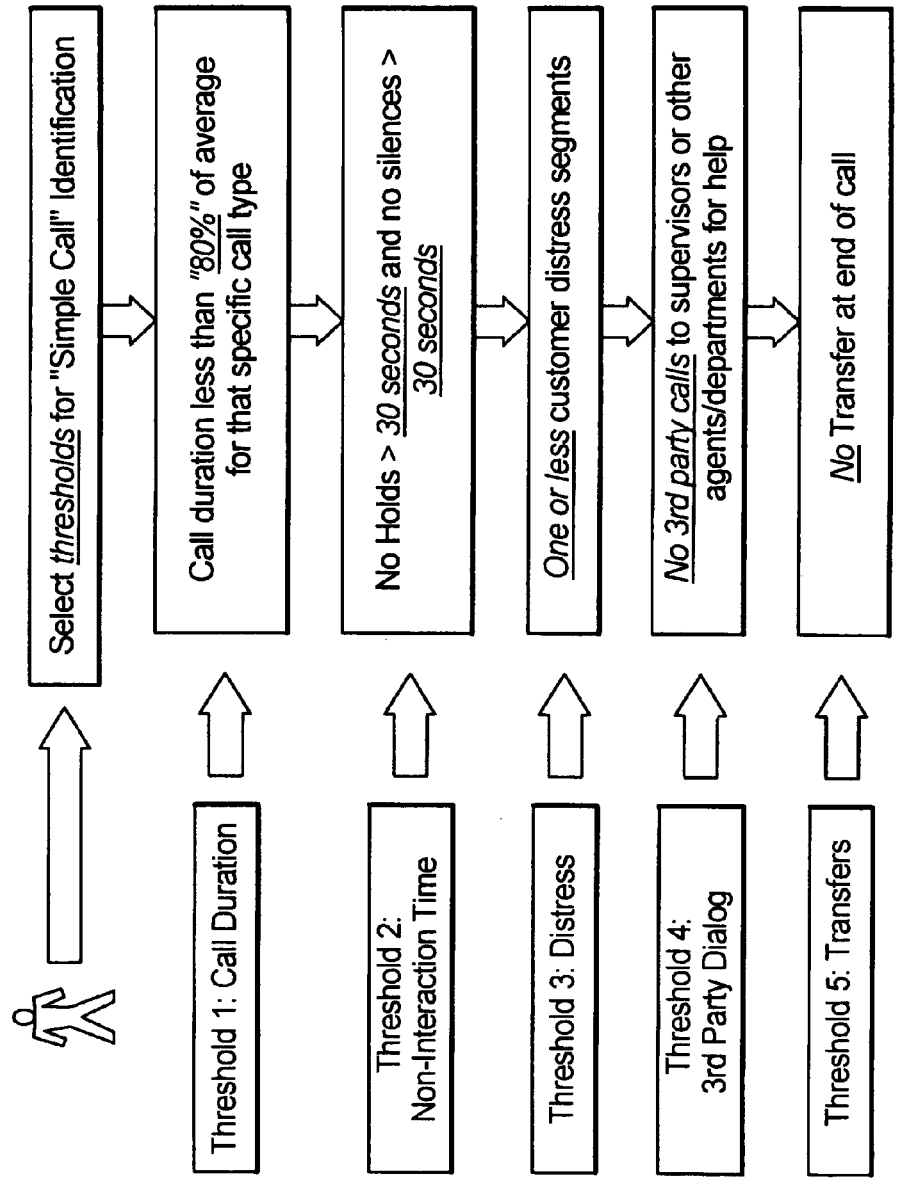
FIG. 2 is a block diagram illustrating one embodiment of a call rule configuration according to the present invention.

As shown in FIGS. 1-2, the method of the present invention includes the step of establishing a call rule based on desired thresholds. Preferably, the thresholds will include one or more of the following: a call duration threshold, a distress event threshold, a third party dialog threshold, and a call transfer threshold. Telephonic communications are received 20 and categorized into one of a plurality of call sets 30. The method further includes the step of determining the call attributes associated with each of the telephonic communications 40, 41, 42. These call attributes can include one or more of the following: call duration data, distress event data, third party dialog data and call transfer data. The established call rule is then compared to the call attributes of the telephonic communications 50. Data indicative of the complexity of at least one of the call sets is then generated from the comparison 60. According to one embodiment, the generated data includes an indication of whether a call set (or call sets) is self-service eligible 70.

It is contemplated by one embodiment of the present invention that the above described method of determining the complexity of telephonic communication call types can be implemented by a computer program. Now is described in more specific terms, the computer hardware associated with operating the computer program that may be used in connection with the present invention.

Process descriptions or blocks in figures should be understood as representing modules, segments, or portions of code which include one or more executable instructions for implementing specific logical functions or steps in the process. Alternate implementations are included within the scope of the embodiments of the present invention in which functions may be executed out of order from that shown or discussed, including substantially concurrently or in reverse order, depending on the functionality involved, as would be understood by those having ordinary skill in the art.

Figure 3:
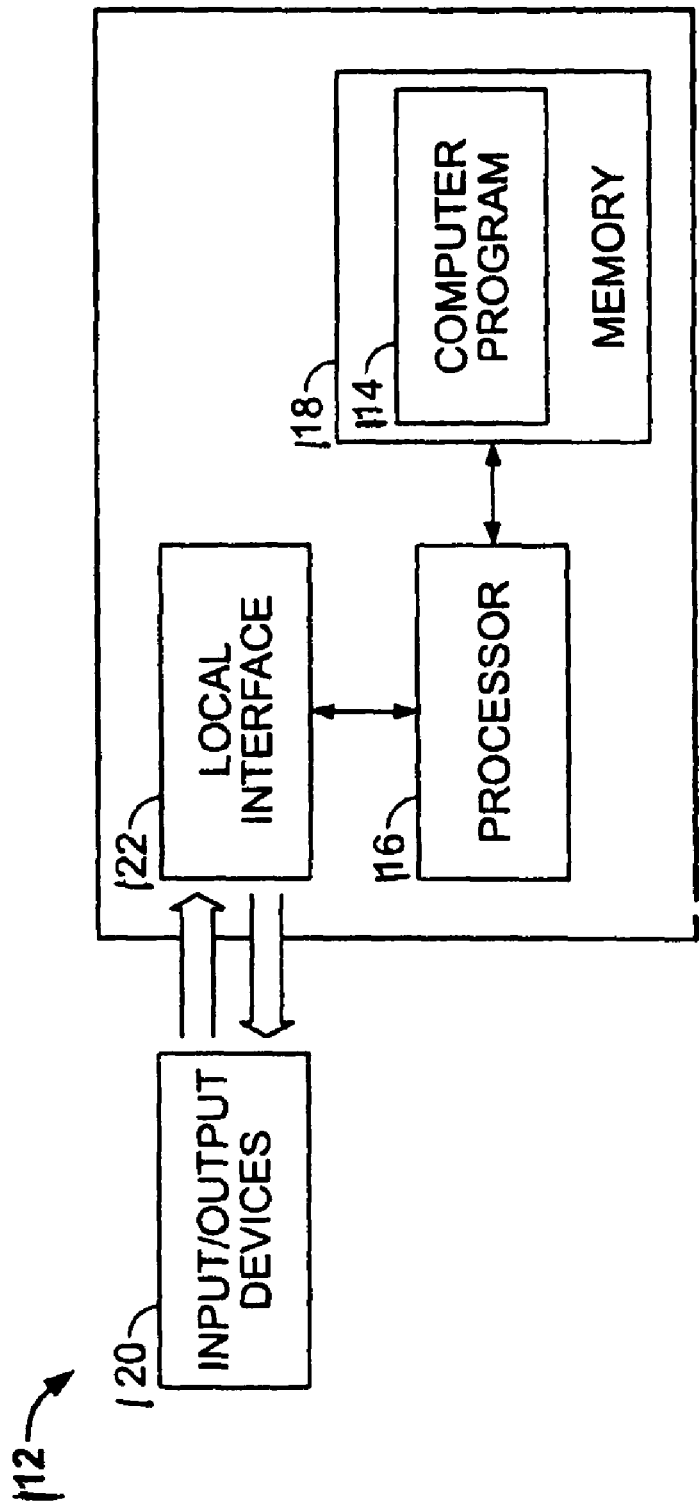
FIG. 3 is a block diagram of a computer used in connection with the present invention.

FIG. 3 is a block diagram of a computer or server 112. For purposes of understanding the hardware as described herein, the terms "computer" and "server" have identical meanings and are interchangeably used. Computer 112 includes control system 114. The control system 114 of the invention can be implemented in software (e.g., firmware), hardware, or a combination thereof. In the currently contemplated best mode, the control system 114 is implemented in software, as an executable program, and is executed by one or more special or general purpose digital computer(s), such as a personal computer (PC; IBM-compatible, Apple-compatible, or otherwise), personal digital assistant, workstation, minicomputer, or mainframe computer. An example of a general purpose computer that can implement the control system 114 of the present invention is shown in FIG. 3. The control system 114 may reside in, or have portions residing in, any computer such as, but not limited to, a general purpose personal computer. Therefore, computer 112 of FIG. 3 may be representative of any computer in which the control system 114 resides or partially resides.

Generally, in terms of hardware architecture, as shown in FIG. 3, the computer 112 includes a processor 116, memory 118, and one or more input and/or output (I/O) devices 120 (or peripherals) that are communicatively coupled via a local interface 122. The local interface 122 can be, for example, but not limited to, one or more buses or other wired or wireless connections, as is known in the art. The local interface 122 may have additional elements, which are omitted for simplicity, such as controllers, buffers (caches), drivers, repeaters, and receivers, to enable communications. Further, the local interface may include address, control, and/or data connections to enable appropriate communications among the other computer components.

The processor 116 is a hardware device for executing software, particularly software stored in memory 118. The processor 116 can be any custom made or commercially available processor, a central processing unit (CPU), an auxiliary processor among several processors associated with the computer 112, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80×8 or Pentium series microprocessor from Intel Corporation, a PowerPC microprocessor from IBM, a Sparc microprocessor from Sun Microsystems, Inc., an 8xxx series microprocessor from Motorola Corporation, Intel Xeon (Single and Dual Core), or Intel Xeon Processor MP (Single and Dual Core).

The memory 118 can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, memory 118 may incorporate electronic, magnetic, optical, and/or other types of storage media. The memory 118 can have a distributed architecture where various components are situated remote from one another, but can be accessed by the processor 116.

The software in memory 118 may include one or more separate programs, each of which comprises an ordered listing of executable instructions for implementing logical functions. In the example of FIG. 3, the software in the memory 118 includes the control system 14 in accordance with the present invention and a suitable operating system (O/S) 124. A non-exhaustive list of examples of suitable commercially available operating systems 124 is as follows: (a) a Windows operating system available from Microsoft Corporation, including Microsoft Vista and Windows Mobile Client; (b) a Netware operating system available from Novell, Inc.; (c) a Macintosh operating system available from Apple Computer, Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time Vxworks operating system from WindRiver Systems, Inc.; or (g) an appliance-based operating system, such as that implemented in handheld computers or personal digital assistants (PDAs) (e.g., PalmOS available from Palm Computing, Inc., and Windows CE available from Microsoft Corporation). The operating system 124 essentially controls the execution of other computer programs, such as the control system 114, and provides scheduling, input-output control, file and data management, memory management, and communication control and related services.

The control system 114 may be a source program, executable program (object code), script, or any other entity comprising a set of instructions to be performed. When a source program, the program needs to be translated via a compiler, assembler, interpreter, or the like, which may or may not be included within the memory 118, so as to operate properly in connection with the O/S 24. Furthermore, the control system 114 can be written as (a) an object oriented programming language, which has classes of data and methods, or (b) a procedure programming language, which has routines, subroutines, and/or functions, for example but not limited to, C, C++, C# (C Sharp), PHP, Pascal, Basic, Fortran, Cobol, Perl, Java, and Ada. In one embodiment, the control system 114 is written in C#. The I/O devices 20 may include input devices, for example but not limited to, a keyboard, mouse, scanner, microphone, touch screens, interfaces for various medical devices, bar code readers, stylus, laser readers, radio-frequency device readers, etc. Furthermore, the I/O devices 120 may also include output devices, for example but not limited to, a printer, bar code printers, displays, etc. Finally, the I/O devices 120 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 112 is a PC, workstation, PDA, or the like, the software in the memory 118 may further include a basic input output system (BIOS) (not shown in FIG. 3). The BIOS is a set of software routines that initialize and test hardware at startup, start the O/S 124, and support the transfer of data among the hardware devices. The BIOS is stored in ROM so that the BIOS can be executed when the computer 112 is activated.

When the computer 112 is in operation, the processor 116 is configured to execute software stored within the memory 118, to communicate data to and from the memory 118, and to generally control operations of the computer 112 pursuant to the software. The control system 114 and the O/S 24, in whole or in part, but typically the latter, are read by the processor 116, perhaps buffered within the processor 116, and then executed.

When the control system 114 is implemented in software, as is shown in FIG. 3, it should be noted that the control system 114 can be stored on any computer readable medium for use by or in connection with any computer related system or method. In the context of this document, a "computer-readable medium" can be any means that can store, communicate, propagate, or transport the program for use by or in connection with the instruction execution system, apparatus, or device. The computer readable medium can be for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory. The control system 114 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In another embodiment, where the control system 114 is implemented in hardware, the control system 114 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Referring now to FIG. 2, the computer program is first configured by inputting desired phone event data thresholds and distress event data thresholds to define a call rule. More particularly, the call rule is composed of one or more thresholds that can be set by user input through known input means such as, for example, a keyboard, a touch screen, a dropdown menu or other known input devices and mechanisms. The thresholds can be static thresholds coded directly into the computer program. Alternatively, the thresholds can be dynamically generated (as discussed below) based on the output of prior analyses.

In any of these embodiments, the call rule will preferably include at least one of the following thresholds: a call duration threshold, a distress event threshold, a third party dialog threshold, and a call transfer threshold. Preferably, the call rule will include values associated with each of the above thresholds. However, it is contemplated that values may be set for less than all of the call duration threshold, a distress event threshold, a third party dialog threshold, and a call transfer threshold. It is also understood that additional threshold values can be included in the call rule without deviating from the present invention. FIG. 2 illustrates, one example of a call rule configuration used in connection with the present invention. It will be understood that the call rule configuration shown in FIG. 2 is merely provided for exemplary purposes, and is not meant to limit the values or thresholds that can be included in the call rule.

As shown in the example of FIG. 2, multiple types of phone event data thresholds can be included in the call rule configuration. Preferably included among the phone event data types are: a call duration threshold, non-interaction time threshold, third party dialog threshold and call transfer threshold. It is contemplated that the call duration threshold may be an absolute value (e.g., a call duration of no longer than two minutes). Alternatively, as in the example in FIG. 2, the call duration threshold can be based on a value generated from past data associated with calls of a similar type, a similar customer, a similar industry, or based on some other suitable metric (e.g., a call duration of less than 80% of the average for a particular call type). Non-interaction time during a telephonic communication may include various occurrences during the communication. For example, non-interaction time can include hold durations, "dead-air" (e.g., instances of interaction silence on the part of one or all of the participants), time between transfers or any other instances in which there is no active communication between the caller and call recipient (i.e., contact center). A third party dialog event includes those instances in which a third party supervisor, agent, department or other third party to an initial telephonic communication between a caller and contact center agent is interjected into the communication. Transfers may include passing the communication along to supervisors, agents, departments, IVR or any other contact center recipient other than the initial agent to whom the communication was placed.

As shown in the example of FIG. 2, a distress threshold also can be selected during the call rule configuration. In the example shown in FIG. 2, the distress threshold is set to a value of "one or less distress segments" during a particular telephonic communication. As discussed in further detail herein, distress in a phone call may be measured in terms of behavioral data and distress data associated with the voice data of the telephonic communication.

After the computer program receives the call rule configuration, it receives at least one telephonic communication, and more preferably, a plurality of telephonic communications. Preferably, the telephonic communication is a recorded communication received from a recording database. However, it is also contemplated that analysis may be conducted on a real-time telephonic communication. In such an instance, it will not be necessary to employ a separate recording database or the like. Instead, any subsequent analysis of the telephonic communication will be performed at the site of the computer program defined by one embodiment of the present invention. Now will be described in detail preferred methods of receiving telephonic communications at a call center.

Figure 4:
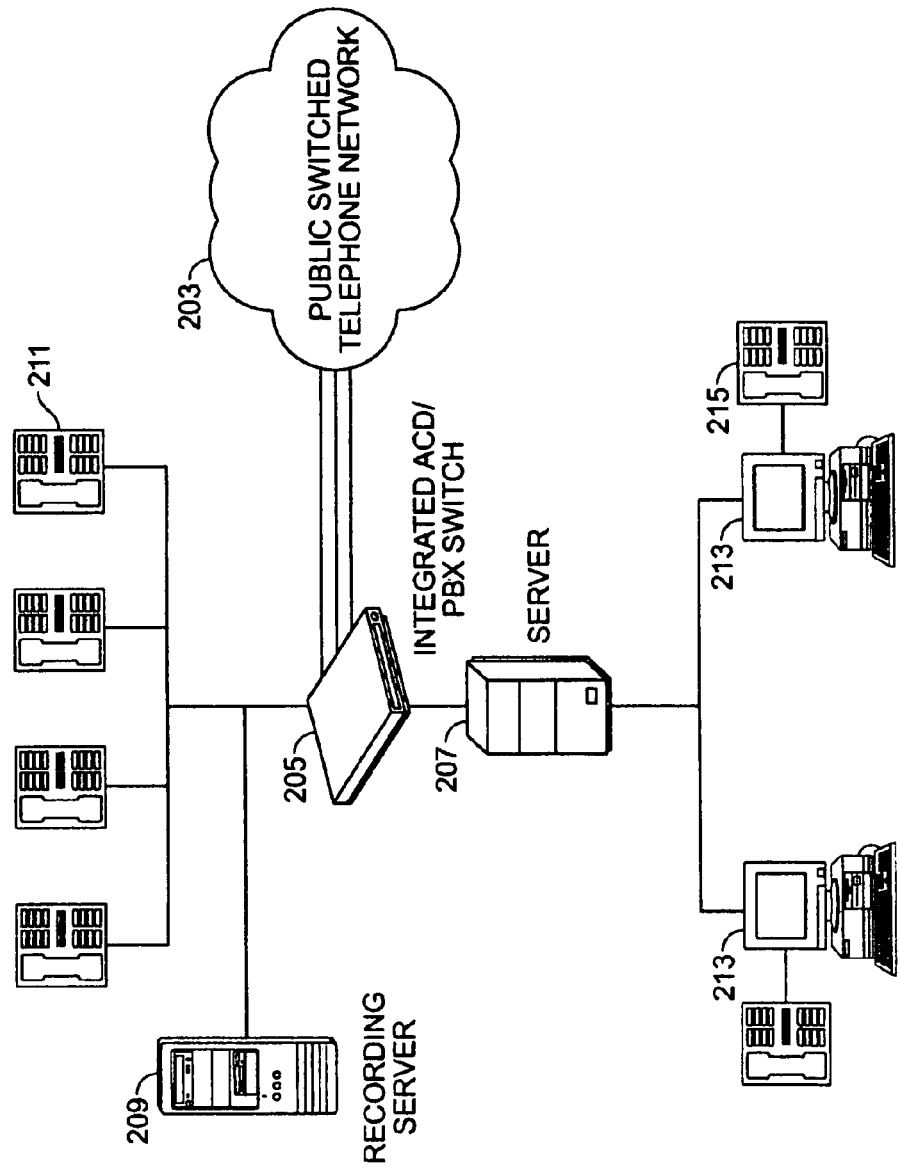
FIG. 4 is a block diagram of a telephonic communication system according to the present invention.

As may be seen in FIG. 4, a telephonic communication may access a contact center directly through the public switched telephone network (PSTN) 203. Alternatively, the telephonic communication can be distributed through a private branch exchange (PBX), having a public switched telephone network (PSTN) 203 connected to the PBX through a PBX switch 205. The PBX switch 205 provides an interface between the PSTN 203 and a local network. Preferably, the interface is controlled by software stored on a telephony server 207 coupled to the PBX switch 205. The PBX switch 205, using interface software, connects trunk and line station interfaces of the public switch telephone network 203 to stations of a local network or other peripheral devices contemplated by one skilled in the art. Further, in another embodiment, the PBX switch may be integrated within a telephony server 207. The stations may include various types of communication devices connected to the network, including the telephony server 207, a recording server 209, telephone stations 211, and client personal computers 213 equipped with telephone stations 215. The local network may further include fax machines and modems and other devices.

According to the present invention, computer telephony integration ("CTI") technology is provided. In a preferred embodiment discussed herein, CTI resides on a telephony server 207. However, it will be understood by those skilled in the art that CTI can reside on its own server or at other hardware described herein. Generally, in terms of hardware architecture, the telephony server 207 includes a processor, memory, and one or more input and/or output (I/O) devices (or peripherals) that are communicatively coupled via a local interface. The processor can be any custom-made or commercially available processor, a central processing unit (CPU), an auxiliary processor among several processors associated with the telephony server 207, a semiconductor based microprocessor (in the form of a microchip or chip set), a macroprocessor, or generally any device for executing software instructions. The memory of the telephony server 207 can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). The telephony server 207 may further include a keyboard and a mouse for control purposes, and an attached graphic monitor for observation of software operation. It will be understood that the telephony server may include standard CTI technology, such as that sold by Cisco, Avaya, Genesys or other provider of CTI providers.

According to one embodiment, the telephony server 207 also incorporates PBX control software to control the initiation and termination of connections between stations and via outside trunk connections to the PSTN 203. In addition, the software may monitor the status of all telephone stations 211 in real-time on the network and may be capable of responding to telephony events to provide traditional telephone service. This may include the control and generation of the conventional signaling tones such as dial tones, busy tones, ring back tones, as well as the connection and termination of media streams between telephones on the local network. Further, the PBX control software may use a multi-port module 223 and PCs to implement standard PBX functions such as the initiation and termination of telephone calls, either across the network or to outside trunk lines, the ability to put calls on hold, to transfer, park and pick up calls, to conference multiple callers, and to provide caller ID information.

Figure 6:
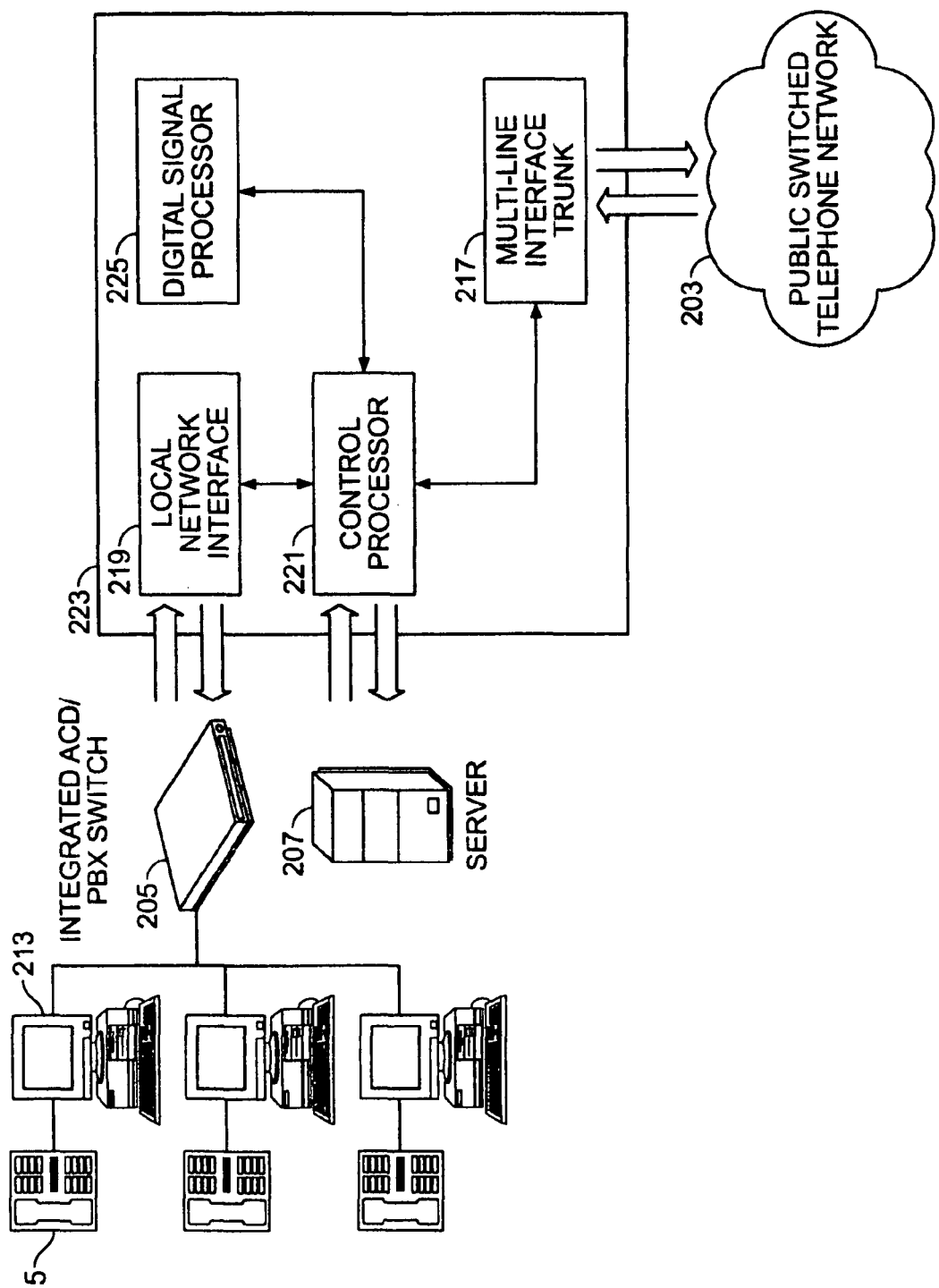
FIG. 6 is a block diagram of a telephonic communication system with a multi-port PSTN module according to the present invention.

Referring to FIG. 6 in one embodiment, the telephony server 207 is equipped with multi-port PSTN module 223 having circuitry and software to implement a trunk interface 217 and a local network interface 219. The PSTN module 223 comprises a control processor 221 to manage the transmission and reception of network messages between the PBX switch 205 and the telephony server 207. The control processor 221 is also capable of directing network messages between the PBX switch 205, the local network interface 291, the telephony network server 207, and the trunk interface 217. In the one embodiment, the local network uses Transmission Control Protocol/Internet Protocol (TCP/IP), also known as Voice Over IP (VoIP). The network messages may contain computer data, telephony transmission supervision, signaling and various media streams, such as audio data and video data. The control processor 221 directs network messages containing computer data from the PBX switch 205 to the telephony network server 207 directly through the multi-port PSTN module 223.

The control processor 221 may include buffer storage and control logic to convert media streams from one format to another, if necessary, between the trunk interface 217 and local network. The trunk interface 217 provides interconnection with the trunk circuits of the PSTN 203. The local network interface 219 provides conventional software and circuitry to enable the telephony server 207 to access the local network. The buffer RAM and control logic implement efficient transfer of media streams between the trunk interface 217, the telephony server 207, the digital signal processor 225, and the local network interface 219.

The trunk interface 217 utilizes conventional telephony trunk transmission supervision and signaling protocols required to interface with the outside trunk circuits from the PSTN 203. The trunk lines carry various types of telephony signals such as transmission supervision and signaling, audio, fax, or modem data to provide plain old telephone service (POTS). In addition, the trunk lines may carry other communication formats such T1, ISDN or fiber service to provide telephony or multimedia data images, video, text or audio.

The control processor 221 manages real-time telephony event handling pertaining to the telephone trunk line interfaces, including managing the efficient use of digital signal processor resources for the detection of caller ID, DTMF, call progress and other conventional forms of signaling found on trunk lines. The control processor 221 also manages the generation of telephony tones for dialing and other purposes, and controls the connection state, impedance matching, and echo cancellation of individual trunk line interfaces on the multi-port PSTN module 223.

Preferably, conventional PBX signaling is utilized between trunk and station, or station and station, such that data is translated into network messages that convey information relating to real-time telephony events on the network, or instructions to the network adapters of the stations to generate the appropriate signals and behavior to support normal voice communication, or instructions to connect voice media streams using standard connections and signaling protocols. Network messages are sent from the control processor 221 to the telephony server 207 to notify the PBX software in the telephony server 207 of real-time telephony events on the attached trunk lines. Network messages are received from the PBX Switch 205 to implement telephone call supervision and may control the set-up and elimination of media streams for voice transmission.

The local network interface 219 includes conventional circuitry to interface with the local network. The specific circuitry is dependent on the signal protocol utilized in the local network. In one embodiment, the local network may be a local area network (LAN) utilizing IP telephony or VoIP. IP telephony integrates audio and video stream control with legacy telephony functions and may be supported through the H.323 protocol. H.323 is an International Telecommunication Union-Telecommunications protocol used to provide voice and video services over data networks. H.323 permits users to make point-to-point audio and video phone calls over a local area network. IP telephony systems can be integrated with the public telephone system through a local network interface 219, such as an IP/PBX-PSTN gateway, thereby allowing a user to place telephone calls from an enabled computer. For example, a call from an IP telephony client to a conventional telephone would be routed on the LAN to the IP/PBX-PSTN gateway. The IP/PBX-PSTN gateway translates H.323 protocol to conventional telephone protocol and routes the call over the conventional telephone network to its destination. Conversely, an incoming call from the PSTN 203 is routed to the IP/PBX-PSTN gateway and translates the conventional telephone protocol to H.323 protocol.

As noted above, PBX trunk control messages are transmitted from the telephony server 207 to the control processor 221 of the multi-port PSTN. In contrast, network messages containing media streams of digital representations of real-time voice are transmitted between the trunk interface 217 and local network interface 219 using the digital signal processor 225. The digital signal processor 225 may include buffer storage and control logic. Preferably, the buffer storage and control logic implement a first-in-first-out (FIFO) data buffering scheme for transmitting digital representations of voice audio between the local networks to the trunk interface 217. It is noted that the digital signal processor 225 may be integrated with the control processor 221 on a single microprocessor.

The digital signal processor 225 can include a coder/decoder (CODEC) connected to the control processor 221. The CODEC may be a type TCM29c13 integrated circuit made by Texas Instruments, Inc. In one embodiment, the digital signal processor 225 receives an analog or digital voice signal from a station within the network or from the trunk lines of the PSTN 203. The CODEC converts the analog voice signal into in a digital from, such as digital data packets. It should be noted that the CODEC is not used when connection is made to digital lines and devices. From the CODEC, the digital data is transmitted to the digital signal processor 225 where telephone functions take place. The digital data is then passed to the control processor 221 which accumulates the data bytes from the digital signal processor 225. It is preferred that the data bytes are stored in a first-in-first-out (FIFO) memory buffer until there is sufficient data for one data packet to be sent according to the particular network protocol of the local network. The specific number of bytes transmitted per data packet depends on network latency requirements as selected by one of ordinary skill in the art. Once a data packet is created, the data packet is sent to the appropriate destination on the local network through the local network interface 219. Among other information, the data packet contains a source address, a destination address, and audio data. The source address identifies the location the audio data originated from and the destination address identifies the location the audio data is to be sent.

The system permits bi-directional communication by implementing a return path allowing data from the local network, through the local network interface 219, to be sent to the PSTN 203 through the multi-line PSTN trunk interface 217. Data streams from the local network are received by the local network interface 219 and translated from the protocol utilized on the local network to the protocol utilized on the PSTN 203. The conversion of data may be performed as the inverse operation of the conversion described above relating to the IP/PBX-PSTN gateway. The data stream is restored in appropriate form suitable for transmission through to either a connected telephone 211, 215 or an interface trunk 217 of the PSTN module 223, or a digital interface such as a T1 line or ISDN. In addition, digital data may be converted to analog data for transmission over the PSTN 203.

Generally, the PBX switch of the present invention may be implemented with hardware or virtually. A hardware PBX has equipment located local to the user of the PBX system. The PBX switch 205 utilized may be a standard PBX manufactured by Avaya, Cisco, Siemens AG, NEC, Nortel, Toshiba, Fujitsu, Vodavi, Mitel, Ericsson, Panasonic, or InterTel. In contrast, a virtual PBX has equipment located at a central telephone service provider and delivers the PBX as a service over the PSTN 203.

Figure 5:
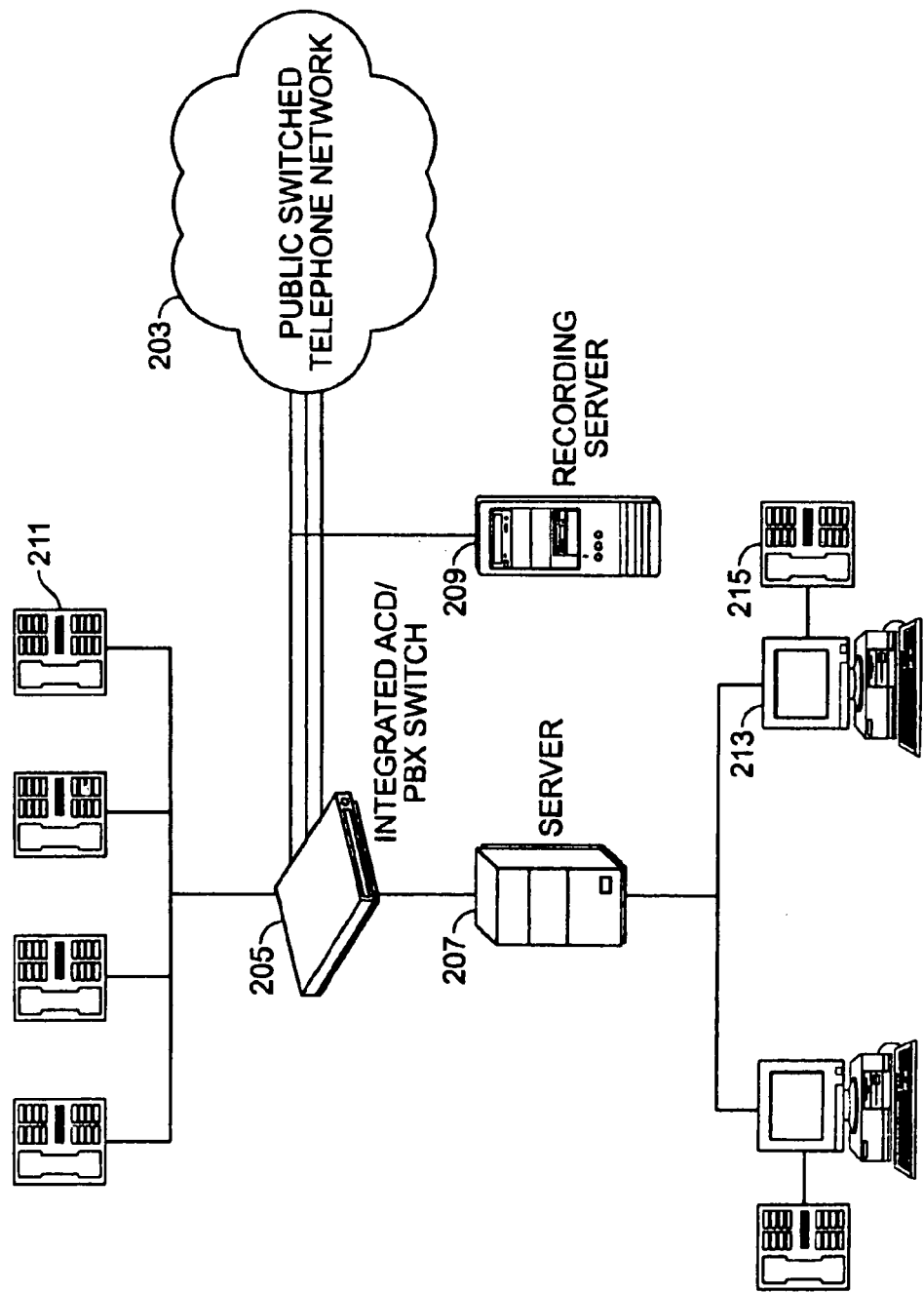
FIG. 5 is a block diagram of another configuration of a telephonic communication system according to the present invention.

As illustrated in FIG. 5 the system includes a recording server 209 for recording voice data associated with a customer communication. The recording server 209 may be connected to a port on the local network to the PSTN trunk line. The recording server 209 is also communicably coupled to the telephony server 207. The recording server 209 includes control system software, namely, recording software. The recording software of the invention can be implemented in software (e.g., firmware), hardware, or a combination thereof. In a currently contemplated preferred embodiment, the recording software is implemented in software, as an executable program, and is executed by one or more special or general purpose digital computer(s). The recording software may reside in, or have portions residing in any computer such as, but not limited to, a general purpose personal computer. While the recording server 209, is configured to store at least the voice data.

Generally, the hardware architecture is the same as that discussed above and shown in FIG. 4. Specifically, the recording server 209 includes a processor, memory, and one or more input and/or output (I/O) devices (or peripherals) that are communicatively coupled via a local interface as previously described. The local interface can be, for example, but not limited to, one or more buses or other wired or wireless connections, as is known in the art. The local interface may have additional elements, which are omitted for simplicity, such as controllers, buffers (caches), drivers, repeaters, and receivers, to enable communications. Further, the local interface may include address, control, and/or data connections to enable appropriate communications among the other computer components.

In one preferred embodiment, the recording server 209 incorporates recording software for recording a telephone signal based on the source address and/or destination address of the signal. The method utilized by the recording server 209 depends on the communication protocol utilized on the communication lines to which the recording server 209 is coupled. The signal carrying audio data of a communication between at least two users can be an analog signal or a digital signal in the form of a network message. In one embodiment, the signal is an audio data transmitted according to a signaling protocol, for example the H.323 protocol described above.

Figure 7:
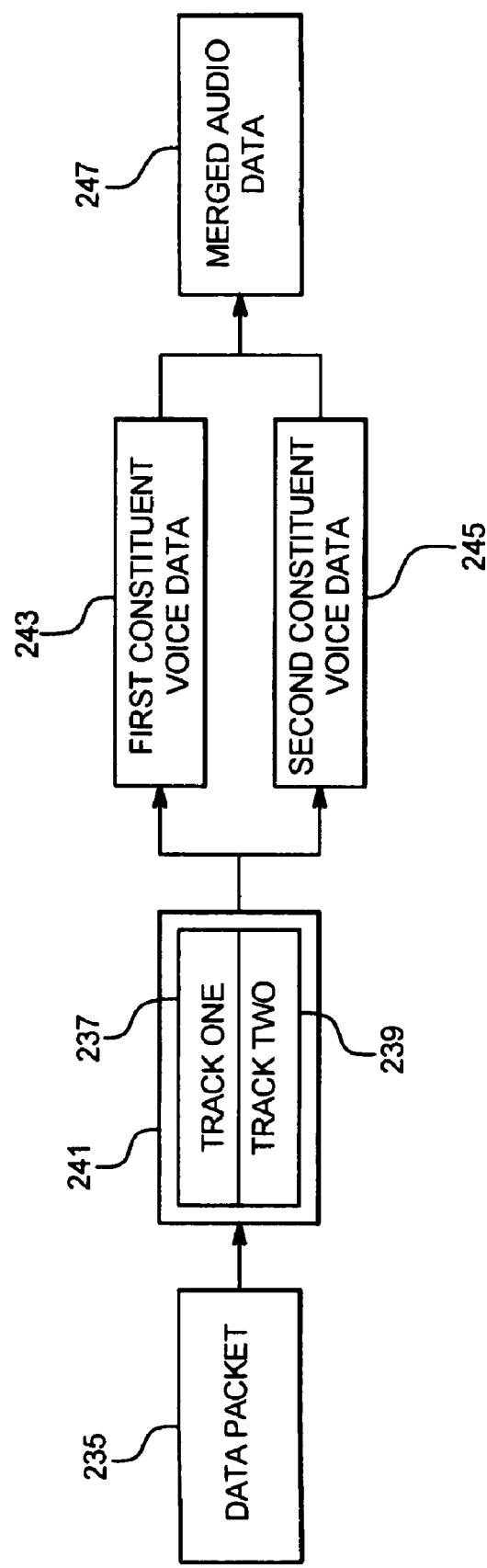
FIG. 7 is a block diagram of a process of recording and separating a telephonic communication.
Figure 8:
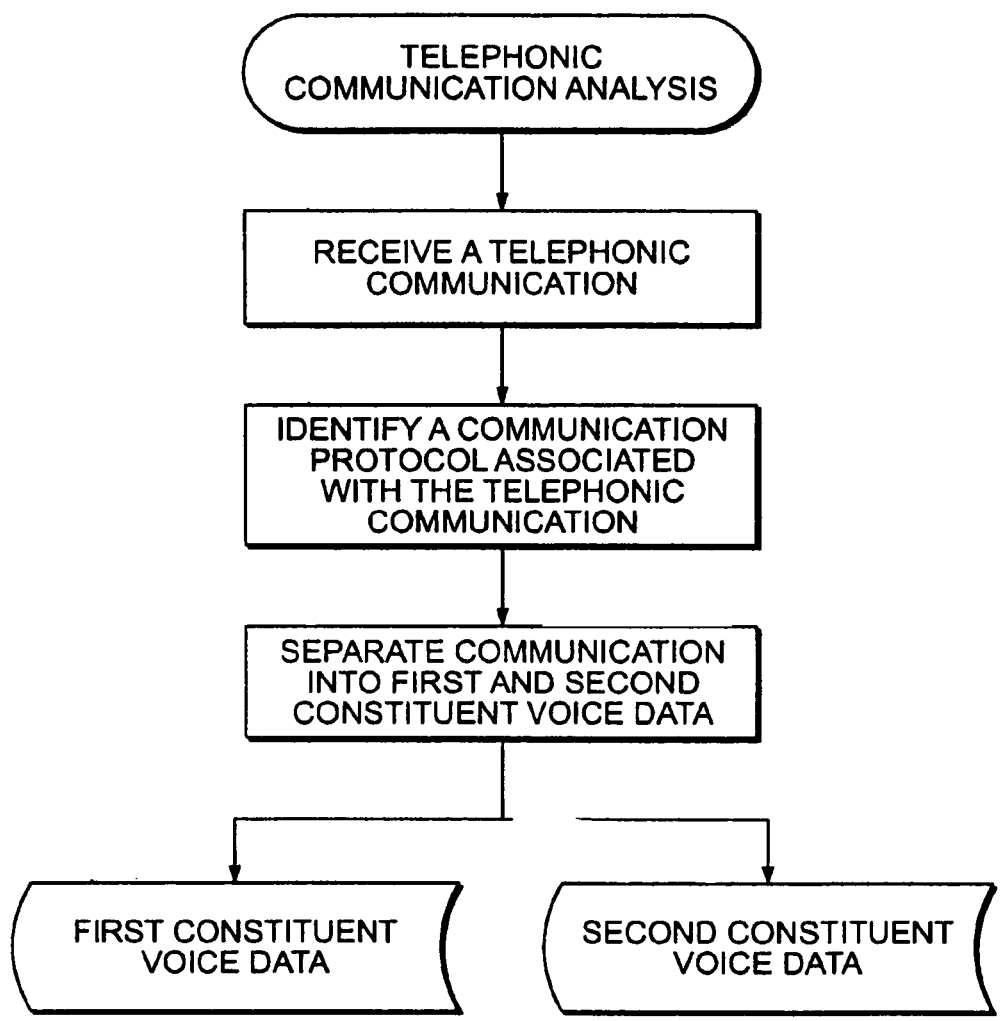
FIG. 8 is a flow chart illustrating the process of recording and separating a telephonic communication in accordance with the present invention.

One example of a recording method that may be used in the present system is illustrated in FIG. 7 and described herein. In the embodiment of FIG. 7 when an outside caller reaches the system through the multi-line interface trunk 217, their voice signal is digitized (if needed), and converted into digital data packets 235 according to the communication protocol utilized on the local network of the system. The data packet 235 comprises a source address identifying the address of the outside caller, a destination address identifying the address of the call center agent, and first constituent audio data comprising at least a portion of the outside caller's voice. The data packet 235 can further comprise routing data identifying how the data packet 235 should be routed through the system and other relevant data. Once the data packet 235 is created, the data packet 235 is sent to the appropriate destination on the local network, such as to a call center agent, through the local network interface 219. The PBX and/or an automatic call distributor (ACD) can determine the initial communication setup, such as the connection state, impedance matching, and echo cancellation, according to predetermined criteria.

Similar to the process described above, as shown in FIG. 8, when the call center agent speaks, their voice is digitized (if needed) and converted into digital data packet 235 according to the communication protocol utilized on the local network. The data packet 235 comprises a source address identifying the address of the call center agent, a destination address identifying the address of the outside caller, and second constituent audio data comprising at least a portion of the call center agent's voice. The data packet 235 is received by the local network interface 219 and translated from the communication protocol utilized on the local network to the communication protocol utilized on the PSTN 203. The conversion of data can be performed as described above. The data packet 235 is restored in appropriate form suitable for transmission through to either a connected telephone 211, 215 or an interface trunk 217 of the PSTN module 223, or a digital interface such as a T1 line or ISDN. In addition, digital data can be converted to analog data for transmission through the PSTN.

In a preferred embodiment, the recording server 209 receives either a data packet comprising the source address identifying the address of the outside caller, a destination address identifying the address of the call center agent, and the first constituent audio data comprising at least a portion of the outside callers voice; or a data packet comprising a source address identifying the address of the call center, a destination address identifying the address of the outside caller, and second constituent audio data comprising at least a portion of the customer's agent voice. It is understood by one of ordinary skill in the art that the recording server 209 is programmed to identify the communication protocol utilized by the local network and extract the audio data within the data packet. In one embodiment, the recording server 209 can automatically identify the utilized communication protocol from a plurality of communication protocols. The plurality of communication protocols can be stored in local memory or accessed from a remote database.

The recording server 209 preferably comprises recording software to record the communication session between the outside caller and a call center agent in a single data file in a stereo format as well as any computer programs or other computer materials used by the CSR agent while responding to the customer call. The first data file a first audio track and a second audio track. Once a telephone connection is established between an outside caller and a call center agent, the recording software creates a first data file to record the communication between the outside caller and the call center agent. It is contemplated that the entire communication session or a portion of the communication session can be recorded.

As noted above, the recording server 209 can be connected to the trunk lines of the PSTN 203 as seen in FIG. 5 The PSTN 203 can utilize a different protocol and therefore, the recording server 209 is configured to identify the communication protocol utilized by the PSTN 203, recognize the source and destination address of a signal and extract the audio data from the PSTN 203. The recording server 209 is programmed in a manner as known to one of ordinary skill in the art.

Once the communication link is terminated, the recording server 209 ends the recording session and stores the single data file having the recorded communication session in memory. After the first data file is stored in memory, the recording server 209 can extract the data from the data file. The constituent data file can be compressed before being stored in memory. The extracted data can be in the form of a digital or analog audio waveform or can be a textual translation of the audio data.

It is contemplated by the present invention that, with respect to the voice data, any necessary mining and analysis in accordance with the present invention can be applied directly to voice data configured in audio format. Preferably, however, the voice data to be mined and analyzed is first translated into a text file. It will be understood by those of skill that the translation of audio to text and subsequent data mining may be accomplished by systems known in the art. It is contemplated that the data file can be further analyzed or processed. For example, among other processes and analyses, filtering techniques can be applied to the data file. Moreover, event data, such as silence periods or over-talking, can be identified by the recording server and stored with the data file using techniques known to those skilled in the art.

It will also be understood that "cradle-to-grave" recording may be used to record all information related to a particular telephone call from the time the call enters the contact center to the later of: the caller hanging up or the agent completing the transaction. The oral call information will be stored in a voice data server. All of the interactions during the call can also be recorded, including interaction with an IVR system, time spent on hold, data keyed through the caller's key pad, conversations with the agent, and screens displayed by the agent at his/her station during the transaction. It is further known that additional voice data may be stored in the voice data. The voice data when stored in a database can be stored in such a known method such that the data is associated with a interaction identifier. Associating the conversation data with a interaction identifier will allow for the data to be easily accessed later.

Based either or both of linguistic and non-linguistic analyses of the telephonic communications, the computer program categorizes each of the telephonic communications into one of a plurality of call sets. These call sets are databases or data sets configured to correlate to a pre-established call type. Accordingly, the telephonic communications received by a contact center can be automatically categorized into one or more call sets, also known as call types, using an appropriate algorithm. For example, the system may employ a word-spotting algorithm that categorizes telephonic communications into particular types or categories based on words used in the communication. In one embodiment, each communication is automatically categorized as a service call type (e.g., a caller requesting assistance for servicing a previously purchased product), a retention call type (e.g., a caller expressing indignation, or having a significant life change event), or a sales call type (e.g., a caller purchasing an item offered by a seller). These types can also be grouped into subcategories appropriate for the particular call type. Alternatively, the telephonic communications may be grouped according to customer categories. For example, a "platinum customers" category may be assigned to high end investors, or a "high volume distributors" category may be assigned to a contact center's best distributors.

As shown in FIG. 1, the computer program of the present invention is configured to determine call attributes associated with the telephonic communications categorized within the call sets. The relevant call attributes generally correspond to the thresholds of the call rule. In particular, it is understood that the call attributes will include one or more of the following phone event data: call duration data, third party dialog data and call transfer data. Phone event data, such as non-interaction time, third party dialog events, call transfers, as well as other phone event data, is preferably generated by analyzing non-linguistic information from both the separated constituent voice data, or from the subsequently generated audio file. It is also contemplated that phone event data can be generated before the audio waveform is separated.

Figure 9:
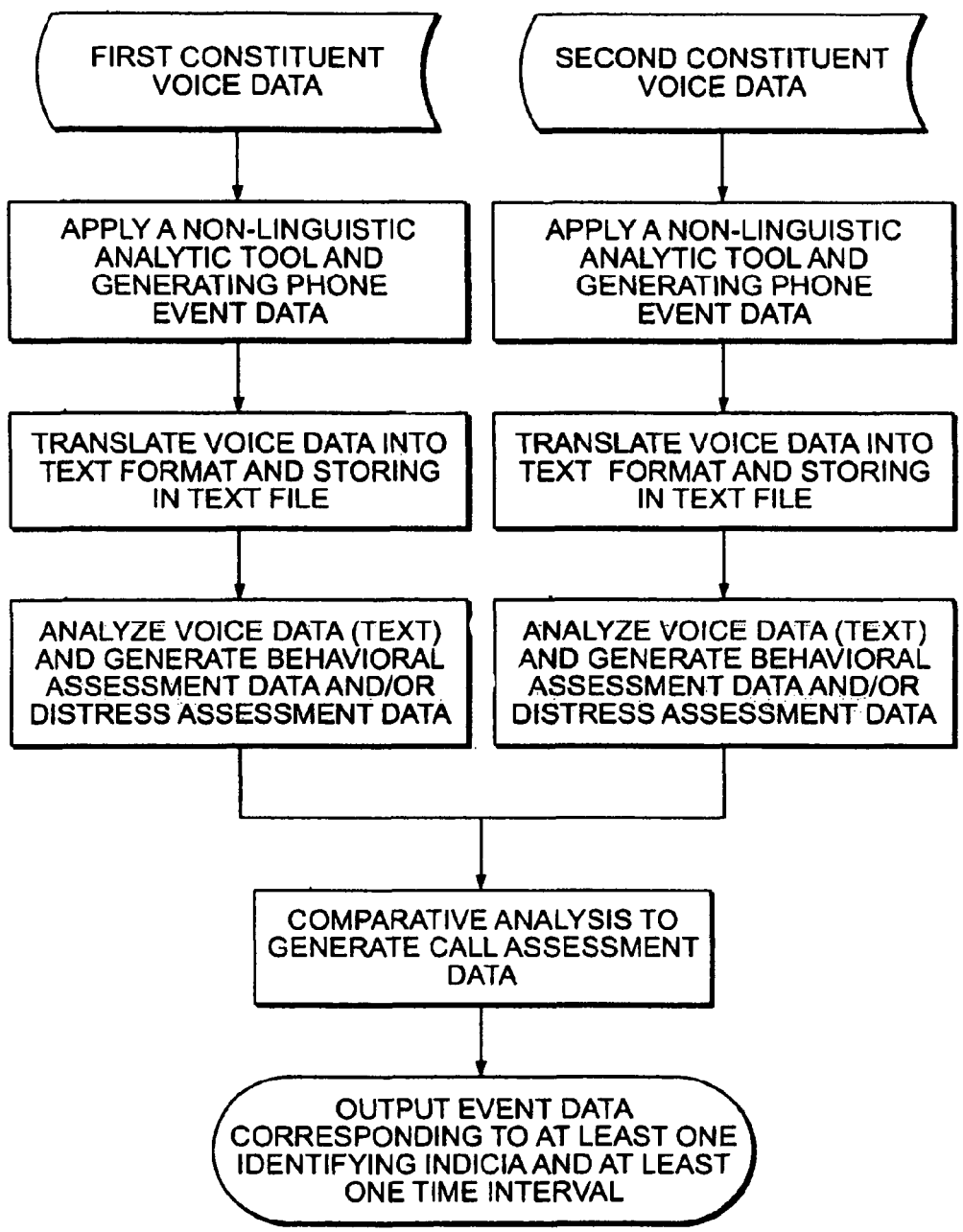
FIG. 9 is a flow chart illustrating the process of recording and separating a telephonic communication in accordance with the present invention.
Figure 10:
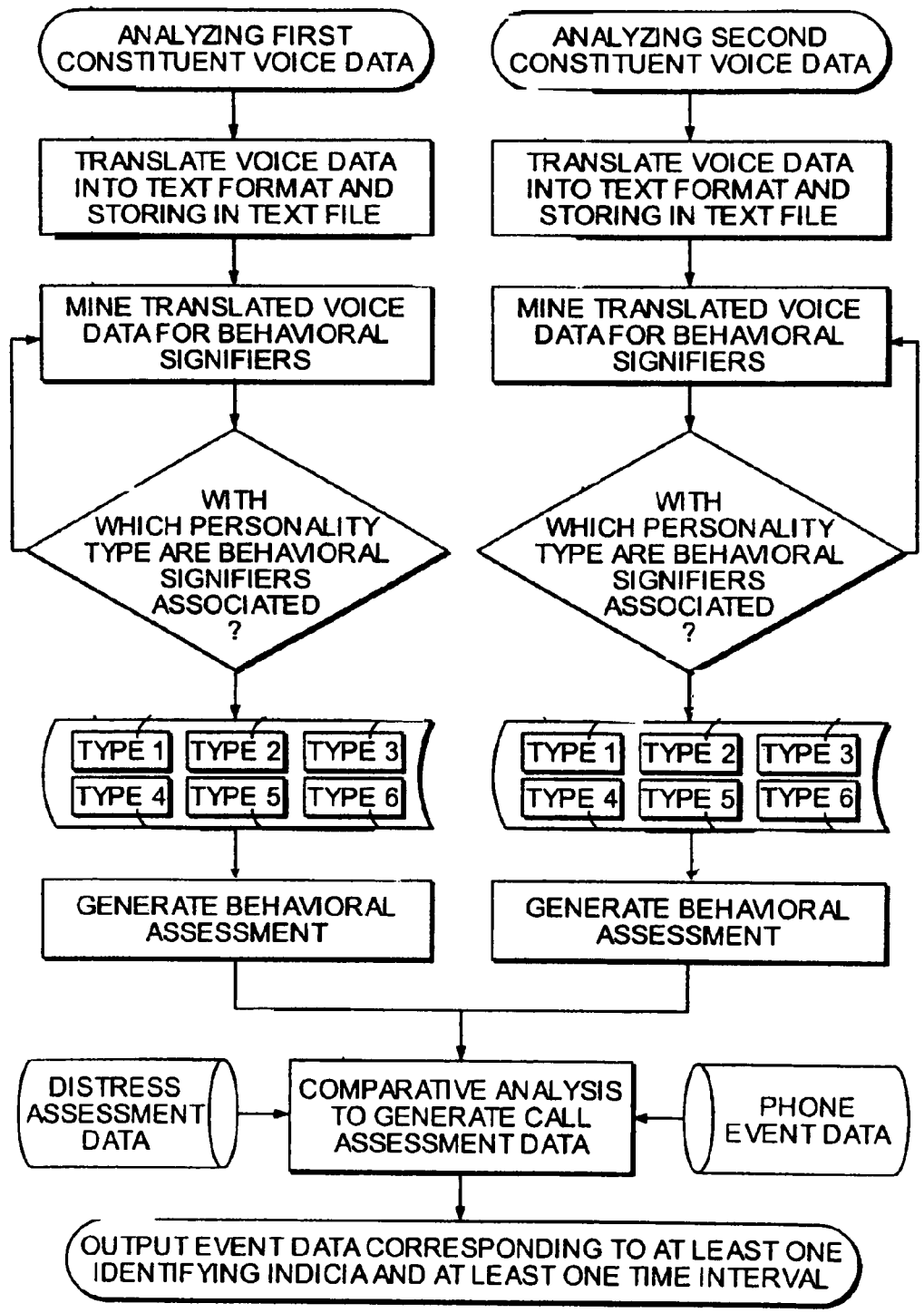
FIG. 10 is a flow chart illustrating a process of analyzing voice data in accordance with the present invention; and, FIG. 11 is a representative report generated by the present invention.

The call attributes will also generally include distress event data, which can include behavioral data and distress data. In one embodiment of the present invention, behavioral data can be generated by mining the voice data associated with a telephonic communication for behavioral signifiers associated with a linguistic-based psychological behavioral model. In particular, the voice data is searched for text-based keywords (i.e., behavioral signifiers) relevant to a predetermined psychological behavioral model. One preferred such psychological behavioral model and behavioral analysis is generally illustrated in FIGS. 9-10 and described in U.S. patent application Ser. No. 11/131,486 entitled METHOD AND SYSTEM FOR ANALYZING SEPARATED VOICE DATA OF A TELEPHONIC COMMUNICATION BETWEEN A CUSTOMER AND A CONTACT CENTER BY APPLYING A PSYCHOLOGICAL BEHAVIORAL MODEL THERETO, which is incorporated herein by reference.

Distress data may be generated by subjecting the voice data associated with a telephonic communication to distress analysis. In one embodiment, a distress analysis is preferably conducted on both the textual translation of the voice data and the audio file containing voice data. It is contemplated that linguistic-based analytic tools as well as known non-linguistic analytic tools can be applied to the audio file. For example, one of skill in the art may apply spectral analysis to the audio file voice data while applying a word spotting analytical tool to the text file. Linguistic-based word spotting analysis and algorithms for identifying distress can be applied to the textual translation of the communication.

Once the call attributes have been determined, the computer program of the present invention then compares the call rule to the call attributes associated with the recorded telephonic communications categorized in one or more of the call sets. Output data indicative of the complexity of the call type is then generated and transmitted. According to one embodiment, the generated and transmitted output data indicates whether at least one of the call sets is self-service eligible. Thus, if the call attributes meet (either by exceeding or falling below, depending on the nature of the configuration) the corresponding thresholds of the call rule, the output data is generated indicating that future telephonic communications of a particular call type or call types may be better suited for routing through a self-service system such as, for example, an IVR or Internet web portal. According to one embodiment, the output data also can be used to recalibrate the call rule. In such an instance the thresholds used in the call rule can be automatically adjusted thereby creating a dynamic call rule.

Additionally, according to one embodiment, the present invention can determine the total hours associated with each of the call sets. As shown in FIG. 1, the generated output data can include reports that illustrate the total hours spent on a particular call set (i.e., call type) 80. That number can then be analyzed based on a predetermined or dynamic cost factor. Accordingly, information may be gleaned by a user as to the cost impact on hours spent on particular call sets (i.e., call types).

It should be understood that while the above embodiment describes a method and system for analyzing the complexity of a plurality of telephonic communications, the present invention may also be employed to determine the complexity of a single telephonic communication. FIG. 1 shows a method of determining the complexity of a single telephonic communication received by a contact center. The method comprises the step of establishing a call rule based on one or more of a call duration threshold, a distress event threshold, a third party dialog threshold, and a call transfer threshold as described above. A recorded telephonic communication is received and call attributes associated with the telephonic communication are determined in accordance with the methods previously discussed. The call attributes include one or more of the following: call duration data, distress event data, third party dialog data and call transfer data. The established call rule is compared to the call attributes of the telephonic communication, and data indicative of the complexity of the telephonic communication is generated.

As with the analysis of multiple telephonic communication, the method of analyzing the complexity of a single telephonic communication can be implemented in a computer program in which code segments perform various tasks. The computer program receives an input transmission of a predetermined call rule. The computer program also receives a telephonic communication and determines the call attributes associated with the telephonic communication. The call rules are compared by the computer program to the call attributes of the telephonic communication. Output data indicative of the complexity of the telephonic communication is then generated.

In one embodiment of the invention, discussed above, the computer program generates an audio file of the telephonic communication. From the generated audio file a graphical user interface ("GUI") for viewing the telephonic communication on a display is generated. The GUI can be configured to display a time-based representation of the telephonic communication and a graphical representation of the progress of the audio file being played. Additionally, it is contemplated that the time-based representation can include graphical representations of the call attributes associated with the telephonic communication. In the embodiment, the GUI enables a user of the system to locate one or more telephonic communications, and to display information relating to single events occurring during the telephonic communication, or the entire conversation.

The GUI is preferably located on a portal server. However, it is contemplated that the GUI may be disposed on any hardware or software communicably coupled to the communication system. The GUI is adapted to display a field for enabling identification of telephonic communications, as well as information associated with the telephonic communications.

It is also contemplated that the GUI can enable a user to navigate through the system 1 to obtain desired reports and information regarding the caller interaction events stored in memory. The GUI can be part of a software program residing in whole or in part in the a computer 112, or it may reside in whole or in part on a server coupled to a computer 112 via a network connection, such as through the Internet or a local or wide area network (LAN or WAN). Moreover, a wireless connection can be used to link to the network.

The GUI can be generated by a local computer, or from a remote server coupled to the user's computer via a network connection. In this latter instance, the invention further includes generate a web page containing the graphical user interface that is downloadable to a computer, and downloading the page via the network connection.

While the specific embodiments have been illustrated and described, numerous modifications come to mind without significantly departing from the spirit of the invention and the scope of protection is only limited by the scope of the accompanying Claims.

What is claimed is:

1. A non-transitory computer program for determining the complexity of a telephonic communication received by a contact center, the computer program being embodied on a computer readable storage medium adapted to control a computer and comprising:

a code segment for receiving an input transmission of a predetermined call rule;

a code segment for receiving a telephonic communication;

a code segment for determining call attributes associated with the telephonic communication;

a code segment for comparing the call rule to the call attributes of the telephonic communication; and a code segment for generating output data indicative of the complexity of the telephonic communication and, a code segment for generating a graphical user interface for viewing the telephonic communication on display, the graphical user interface being configured to display a time-based being representation of the telephonic communication, the time-based representation including graphical representation of the call attributes associated with the telephonic communication; wherein the time-based representation of the telephonic communication includes a graphical representation of the progress of the audio file being played.

2. The computer program of claim 1, wherein the at least one predetermined call rule is based on at least one of a call duration threshold, a non-interaction threshold, a distress event threshold, a third party dialog threshold, and a call transfer threshold.

3. The computer program of claim 1, wherein the call attributes comprise at least one of call duration data, non-interaction data, distress event data, third party dialog data and call transfer data.

4. The computer program of claim 1, wherein the at least one predetermined call rule is automatically and dynamically generated based on the output data.

5. The computer program of claim 1, wherein the received telephonic communication is a pre-recorded telephonic communication.

6. The computer program of claim 1, further comprising a code segment for generating an audio file of the telephonic communication.

7. A non-transitory computer program for determining the complexity of telephonic communication call types received by a contact center, the computer program being embodied on a computer readable storage medium adapted to control a computer and comprising:
   a code segment for receiving an input transmission of a predetermined call rule, the call rule comprising at least one of a call duration threshold, a non-interaction threshold, a distress event threshold, a third party dialog threshold, and a call transfer threshold;
   a code segment for receiving a plurality of recorded telephonic communications;
   a code segment for categorizing each of the plurality of recorded telephonic communications into one of a plurality of call sets;
   a code segment for determining call attributes associated with the respective recorded telephonic communications categorized in at least one of the plurality of call sets, the call attributes comprising at least one of call duration data, non-interaction data, distress event data, third party dialog data and call transfer data;
   a code segment for comparing the predetermined call rule to the call attributes associated with the recorded telephonic communications categorized in at least one of the plurality of call sets;
   a code segment for generating output data indicative of the complexity of the call type;
   a code segment for transmitting the output data; and, a code segment for generating a graphical user interface for viewing on a display at least one of the telephonic communications categorized in at least one of the plurality of call sets, the graphical user interface being configured to display a time-based representation of the recorded telephonic communications, the time-based representation including graphical representations of the call attributes associated with the at least one recorded telephonic communications; wherein the time-based representation of the at least one telephonic communication includes a graphical representation of the progress of the audio file being played.

8. The computer program of claim 7, wherein the output data indicates whether the at least one of the plurality of call sets is self-service eligible.

9. The computer program of claim 7, further comprising a code segment for calculating the total time associated with each of the plurality of call sets.

10. The computer program of claim 7, wherein the at least one predetermined call rule is automatically and dynamically generated based on the output data.

11. The computer program of claim 7, further comprising a code segment for generating an audio file of at least one of the recorded telephonic communications categorized in at least one of the plurality of call sets.

12. A method of determining the complexity of a telephonic communication received by a contact center, the method comprising:
   establishing a call rule based on at least one of a call duration threshold, a distress event threshold, a third party dialog threshold, and a call transfer threshold;
   receiving a recorded telephonic communication;
   determining call attributes associated with the telephonic communication comprising at least one of call duration data, distress event data, third party dialog data and call transfer data;
   comparing the established call rule to the call attributes of the telephonic communication;
   generating data from the comparison indicative of the complexity of the telephonic communication; and
   and, a code segment for generating a graphical user interface for viewing the telephonic communication on display, the graphical user interface being configured to display a time-based representation of the telephonic communication, the time-based representation including graphical representations of the call attributes associated with the telephonic communication; wherein the time-based representation of the telephonic communication includes a graphical representation of the progress of the audio file being played.

13. The method of claim 12, wherein the generated data indicates whether the at least one of the plurality of call sets is self-service eligible.

14. The method of claim 12, further comprising determining the total hours associated with each of the plurality of call sets.

15. The method of claim 14, further comprising analyzing the each of the plurality of call sets based on a cost factor.

* * * * *